June 30, 1959   S. MERKOWITZ   2,892,210
RELEASE MECHANISM
Filed Oct. 25, 1954   2 Sheets-Sheet 1
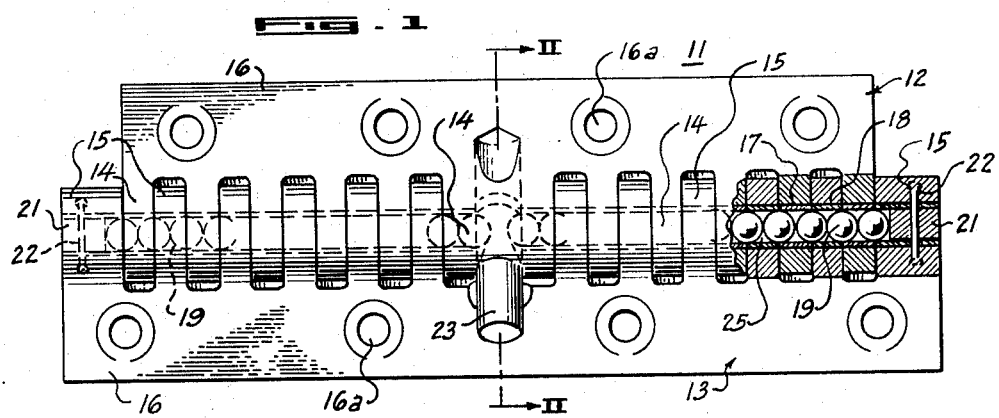
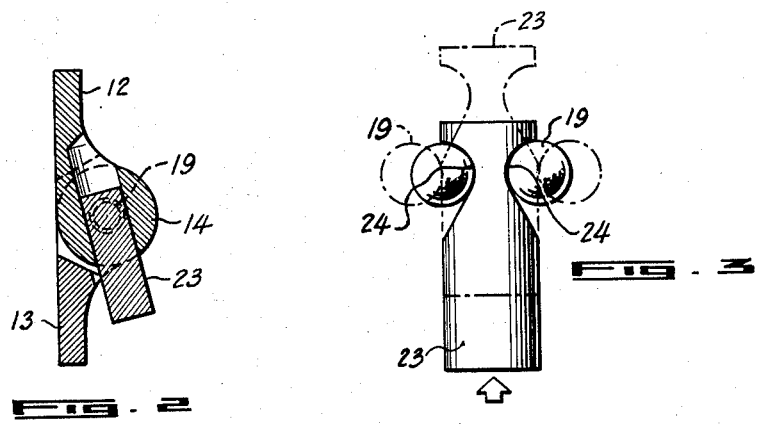
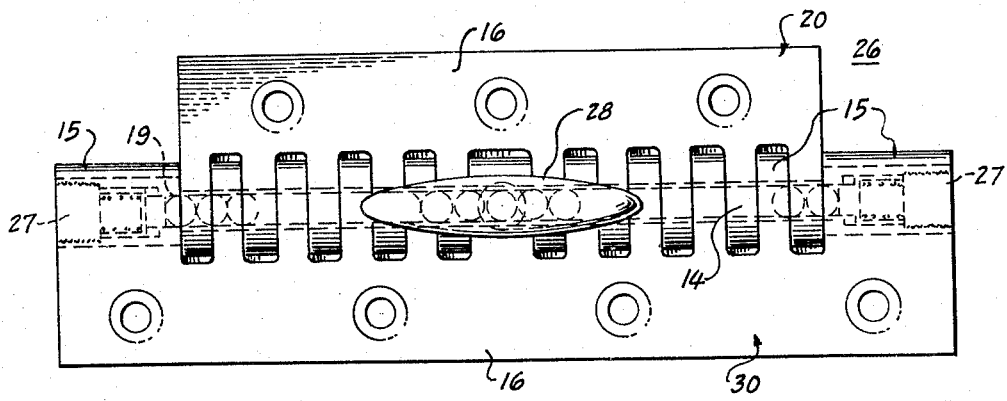
INVENTOR:
Samuel Merkowitz
BY
ATTORNEY June 30, 1959 S. MERKOWITZ 2,892,210
RELEASE MECHANISM
Filed Oct. 25, 1954 2 Sheets-Sheet 2
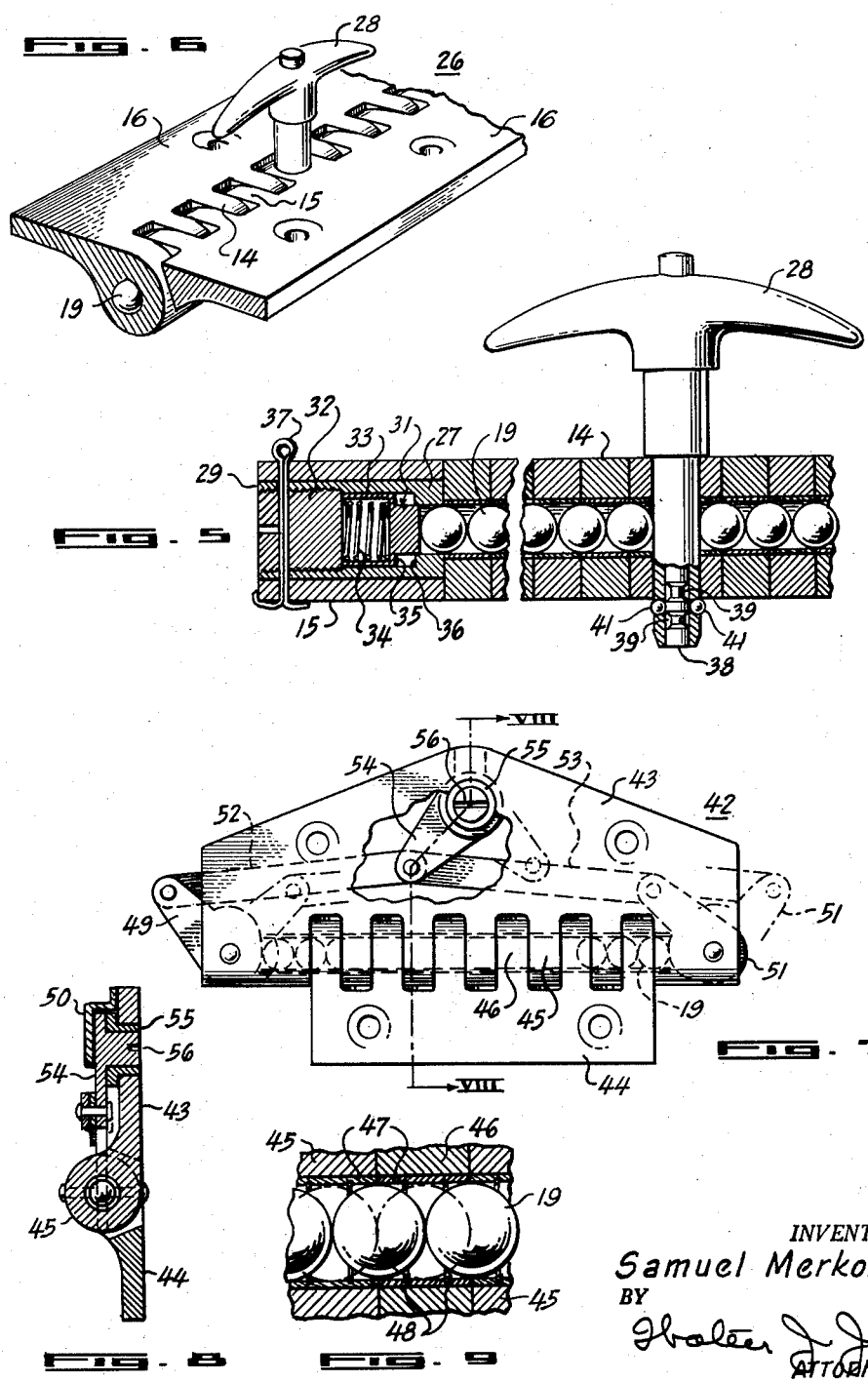
INVENTOR:
Samuel Merkowitz
BY
ATTORNEY

United States Patent Office 2,892,210
Patented June 30, 1959

2,892,210

RELEASE MECHANISM

Samuel Merkowitz, San Diego, Calif., assignor to General Dynamics Corporation, San Diego, Calif., a corporation of Delaware Application October 25, 1954, Serial No. 464,365

18 Claims. (Cl. 16—171)

The present invention relates to release mechanisms and more particularly to a release mechanism which embodies ball elements to provide a quickly releasable connection between a plurality of component members.

Release mechanisms of the prior art, including separable hinge mechanisms and the like, have been found to have shortcomings in quick release applications. The conventional release mechanism or hinge comprises a series of spaced, projecting lobes or fingers which are formed in a pair of members and usually secured together by a single pin or pintle disposed through internal bores provided in the lobes of the pair of members. With this arrangement the pair of members are capable of providing interconnection and support for the parts to which they are mounted, with such interconnection also allowing for pivotal movement between the parts when the mechanism is desired to serve as a hinge. However, any appreciable load on these parts, and consequently the pair of members connecting them, imposes shear loads upon the pin within the projecting lobes and undesirable distortion of the pin often occurs. In addition, continual wear on the pin tends to ridge and groove the pin, principally because of the difficulty of maintaining any appreciable supply of lubricating material within the release mechanism in the absence of adequate space therefor about the pin.

Wear and distortion of the pin or pintle of the conventional release mechanism makes removal of the pin very difficult, if not impossible, and frequently such great force is needed to remove the pin that damage to adjacent structure occurs. In applications where quick release is very important, such as release of an emergency door in an aircraft for example, any interference with the quick removal of the pin could well be disastrous. In maintenance operations the desirability of easy separation of the members of the mechanism is, of course, apparent.

Accordingly, the release mechanism of the present invention includes the usual interfitted pair of members or hinge segments which are found in conventional release mechanisms but with the important substitution of a series of ball elements together with their actuating means, for the usual pin or pintle. These ball elements are disposed within the internal bores of the abutting lobes of the pair of members and are so arranged within such internal bores that a ball is disposed in spanning relation between each pair of adjacent lobes whereby the lobes and consequently the pair of members, are incapable of separation by virtue of the restraining influence of the ball elements. It is noted that spherical form of the ball provides a lubrication reservoir between adjoining balls and the walls of the associated bore.

The spherical shape of the ball elements provides a quick and novel means for effecting a release between connected parts since, as will be apparent, shear forces which are developed by exerting a pull upon the connected parts in attempting to separate or release the parts tends to move the ball elements out of their spanning relation and into housed positions within the lobes of the release mechanism. That is, the shear forces acting upon the ball elements, after an initial movement toward their release positions, do not act along the center lines of the balls but rather on lines offset from such center lines; thus this offset action serves to obtain ready and rapid movement of the balls in either direction to their release position wherein no restraint is offered to the separation of the interfitted parts. Thus, only a minimal initial axial movement need be imparted to the ball elements to achieve release of the connected parts. Unique apparatus is also provided in the various embodiments of the present invention for effecting that movement of the balls which is necessary to permit separation of the connected parts.

Ball elements by their very nature are not subject to bending distortions under very high loads, and, therefore, removal of the ball elements may be had quickly and efficiently without binding or other interference between the ball elements and other portions of the release mechanism. Thus, the mechanism of the present invention is particularly suited for use in quickly jettisoning or releasing from their securing structure such parts and articles as emergency doors, life rafts, access doors, missile components, and the like.

It is therefore a principal object of the present invention to provide an improved release mechanism for securing together a plurality of members, and which is adapted for readily and efficiently disconnecting these members when desired.

Another object of the invention is to provide a novel quick-release mechanism which embodies a plurality of ball elements for normally preventing disconnection between a pair of members but which are movable for permitting rapid disconnection between said pair of members.

It is another object of the invention to provide a unique release mechanism for securing together a plurality of parts, and which utilizes a series of ball elements to prevent separation of the hinge parts and which is adapted to permit release of the hinge parts through a shifting movement toward the center lines of the lobes.

An additional object of the invention resides in the provision of an improved quick-release mechanism embodying ball elements and which is provided with lubrication reservoirs formed between the ball elements and surrounding structure of the mechanism.

Other objects and features of the present invention will be readily apparent to those skilled in the art from the following specification and appended drawings wherein is illustrated a preferred form of the invention, and in which:

Figure 1 is a plan view of a preferred embodiment of the release mechanism of the present invention, a portion of which is cut away for clarity;

Figure 2 is a view taken along II—II of Figure 1;

Figure 3 is a detail plan view of the actuable plug element for the release mechanism;

Figure 4 is a plan view of another embodiment of the release mechanism of the present invention;

Figure 5 is a partial transverse cross-section of the release mechanism illustrated in Figure 4;

Figure 6 is a partial perspective view of the embodiment of the release mechanism illustrated in Figure 4;

Figure 7 is a plan view of a further embodiment of the release mechanism of the present invention, a portion having been cut away for clarity, and with the extreme operating positions of other portions being indicated in phantom outline;

Figure 8 is a view taken along VIII—VIII of Figure 7; and

Figure 9 is a detailed, partial transverse cross-sectional view of the ball retainer means which is adapted for use in the embodiment illustrated in Figure 7.

Referring to the drawings and more particularly to Figures 1, 2, and 3, there is illustrated an embodiment of the release mechanism of the present invention which is particularly adapted for use in conjunction with, for example, the securement and jettisoning of an emergency door of an aircraft, the release mechanism being designated generally by the numeral 11. It is to be understood of course that release mechanism 11 is adapted for use in effecting quick disconnection between various parts or members, and the reference to an emergency door is merely illustrative.

Mechanism 11 comprises a pair of leaves, plates or members 12 and 13 which are provided respectively with a plurality of cooperating and interfitting spaced fingers or lobes 14 and 15, such fingers or journaled edge portions 14 and 15 projecting, as shown, transversely from body portions 16 of members 12 and 13. In addition, members 12 and 13 embody a number of openings 16a which are adapted to accommodate any suitable fastener, such as a screw, rivet or the like, to enable members 12 and 13 to be fastened to a pair of parts which are desired to be connected together, such as the connection between an emergency door and its supporting structure.

Each of the intermating projections or lobes 14 and 15 are journalled or bored axially to receive a corresponding number of bushings 17 and 18 which become aligned when the fingers 14 and 15 are in intermating relation to place their bores in intercommunication to effect a substantially continuous bore and which aligned bushings serve to receive a plurality or train of ball elements 19. It is noted that the ball elements 19 are normally located to span or bridge adjacent knuckle portions or lobes 14 and 15 at the points of juncture therebetween whereby separation of members 12 and 13 is prevented by virtue of the resistance provided by each of these ball elements 19 to any relative movement between lobes 14 and 15 along their adjacent or abutting faces.

The desired location or position of the various balls or ball elements 19 with respect to lobes 14 and 15 is established and maintained by a pair of plugs or stops 21 disposed at the opposite ends of member 13 within the bores provided at such ends; such plugs 21 are secured in position by a pair of rivets or pins 22 disposed through the lobes 15 at the ends of member 13. Pins 22 are headed at their ends to prevent inadvertent loss or removal thereof. However, it is here noted that pins 22 are preferably of a shearable material, such as aluminum, and of a cross sectional area sufficiently small to permit pins 22 deliberately to be carried away or sheared upon the intentional application thereagainst of a calculated force by ball elements 19, as will be seen.

Disposed preferably through the middle one of lobes 14 is an actuating plug, element or wedge 23 which with stops 21 serves to maintain ball elements 19 in their restraining or locking position, as previously described. The middle lobe 14 is made slightly wider than the other lobes 14 in order to readily accommodate the bulk of wedge 23.

Wedge 23 is constructed to permit it to be driven inwardly, and upwardly as viewed in Figures 1 and 3, thereby tending to force ball elements 19 outwardly and away from wedge 23, it being noted that wedge 23 is, however restrained against downward or outward movement by the engagement of the adjacent, cooperating pair of ball elements 19 with a peripherally notched portion 24 of wedge 23.

Application of a dislodging force at the end of wedge 23, as represented by the arrow in Figure 3, will tend to urge ball elements 19 axially away from wedge 23 and against stops 21, effecting a shearing of pins 22, assuming the magnitude of the applied force to be sufficiently great to accomplish the desired shearing. The upward or actuated position of wedge 23, and the corresponding position of the adjacent pair of ball elements 19 in response thereto, are illustrated in phantom outline in Figure 3.

It is understood that the cross-sectional area of pins 22 may be varied in accordance with design requirements since pins 22 serve primarily as a safety means for preventing inadvertent disconnection or release of members 12 and 13. Thus, pins 22 may be made of small cross-sectional area in those situations where it is sufficient that wedge 23 be actuated by a hammer blow or the like, or pins 22 may be made of comparatively greater cross-sectional area where a particular application demands that wedge 23 be actuated by an explosive cartridge or the like.

In order to achieve optimum performance and efficient operation of release mechanism 11, the tolerances between ball elements 19 and bushings 17 and 18 should be relatively close. Because of this requirement, the spherical shape of ball elements 19 is well suited to present manufacturing techniques which are used for obtaining close tolerances, as compared with the greater difficulty which is generally experienced in obtaining close tolerances with elongated members. To maintain the precisely fitted association between ball elements 19, bushings 17, bushings 18, stops 21, and wedge 23, these parts are made of a hard material, preferably steel.

It is noted that in the release mechanism here presented, there is provided a plurality of lubrication spaces about each ball element 19, as at 25, wherein a substantial amount of lubricating material may be stored for use in the operation of release mechanism 11.

Operation of mechanism 11 to release member 12 from member 13 is initiated, as previously described, by causing a force to be applied to wedge 23. This force is transmitted by wedge 23, through the balls 19, to stops 21. In response to this transmitted force, the pins 22 are sheared away and the balls 19 are forced into housed positions within lobes 14 and 15. Initial movement of wedge 23 caused by the above force obviously displaces the balls 19 from normal bridging relationship with lobes 14 and 15 in effecting the shearing of pins 22. It is evident that the shearing forces produced by the application of a separating or pulling force to the members 12 and 13 which initially act through the abutting faces of lobes 14 and 15 along the center lines of the ball elements 19 now with the displacement of ball elements 19 act along lines offset from such center lines to aid rapid movement of the ball elements 19 into their housed positions within lobes 14 and 15. Thereafter, it will be evident that the parts normally secured together by mechanism 11 will become disconnected and in the case of an emergency door on an aircraft, the door will be jettisoned.

Another embodiment of the present invention is illustrated in Figures 4, 5 and 6, this embodiment being generally designated by the numeral 26. Release mechanism 26 is very similar to release mechanism 11, differing mainly in the means for effecting and controlling the movements of ball elements 19. Thus, release mechanism 26 also embodies a separable pair of members 20 and 30 which are substantially similar to members 12 and 13 of the embodiment above described and which members 20 and 30 each include a body portion 16 having usual mounting holes therein for affixing release mechanism 26 to the parts to be connected. The provision of lobes 14 and 15 is also similar to the first embodiment, lobes 14 and 15 each embodying a central bore for receiving bushings 17 and 18 respectively, for guiding and supporting ball elements 19 as before.

In place of plugs 21 used in the first embodiment a pair of limit or stop assemblies 27 are provided within the lobes 15 in this second embodiment at either end of member 30 to limit and control the movement of ball elements 19 in response to the movement of a control, or unlocking element 28, which is transversely disposed preferably through the middle lobe 15, as illustrated in Figure 4. Assemblies 27 each comprises a hollow cylindrical bushing 29 disposed within a bore provided in the corresponding end lobe 15, the interior of bushing 29 being suitably machined out at its inward end to accommodate a plunger 31, and suitably internally threaded at its outward end to receive a threaded plug 32.

Plunger 31 is also hollowed or machined out to form a skirt section 33 for receiving and housing a compression spring 34. Plunger 31, as best seen in Figure 5, is urged inwardly by the bias of spring 34 against the adjacent ball element 19. The extent of inward movement which may be imparted by plunger 31 to the adjacent ball element 19 is limited by contact between an external shoulder 35 of plunger 31 with an internal shoulder 36 of means 27. This limited trend prevents balls 19 from being moved beyond their release or housed positions within lobes 14 and 15.

It is to be noted that when control element 28 is operatively positioned as illustrated in Figures 4 and 5, the displacing force exerted by it upon plungers 31 through ball elements 19 will force plungers 31 outwardly until their skirt sections 33 bottom upon the inward face of their associated threaded plugs 32. In this outward movement of the plungers 31 into engagement with plugs 32, springs 34, which are housed within skirt sections 33, are compressed and placed in condition to bias plungers 31, and consequently ball elements 19, for inward movement immediately upon removal of the control element 28. It is obvious therefore that with the provision of a positive engagement between plungers 31 and plugs 32, ball elements 19 when once moved to locking positions relative to lobes 14 and 15 cannot creep or inadvertently move to release positions. Instead, to achieve any movement of elements 19 there must first be a deliberate removal of either control element 28 or plugs 32. Threaded plugs 32 by their axial position establish and maintain the location of ball elements 19, this axial position of plugs 32 in turn being maintained by a pair of cotter keys 37 or the like, each of which is suitably disposed through the cylindrical walls of a respective end lobe 15 and the outer end portion of a corresponding threaded plug 32.

As has been stated, control element 28 is adapted for removal to permit an inward movement of ball elements 19 into a released or housed position within lobes 14 and 15 to thereby allow separation of members 20 and 30, and consequently the parts which members 20 and 30 connect together, in a manner similar to that previously described in connection with members 12 and 13 of the first embodiment. It is apparent that withdrawal of control element 28 permits inward displacement of the ball elements 19, under the influence of springs 34, from normal bridging relationship with lobes 14 and 15. Accordingly, as described in connection with the embodiment of Figure 1, the shearing forces produced by the application of a separating or pulling force to the members 20 and 30, which initially act through the abutting faces of lobes 14 and 15 along the center lines of the ball elements 19, now with the displacement of ball elements 19 act along lines offset from such center lines to aid rapid movement of the ball elements 19 into their housed positions.

Control element 28 may be any simple plug, rod, or the like which is adapted for withdrawal. However, it is preferred that element 28 require independent actuation before withdrawal thereof can be had to thereby prevent inadvertent or accidental removal from release mechanism 26, such a preferred control element 28 being illustrated in Figure 5 and described in detail in U.S. Pat. No. 2,352,414 issued June 27, 1944. Element 23, as shown, comprises essentially a movable central core 38 which embodies a pair of peripheral depressions 39 at its lower end for accommodating a pair of ball elements 41. These ball elements 41 selectively interfere with, or upon actuation allow, the withdrawal of control element 28, the removal of element 28 being permitted by the housing of the ball elements 41 in either of the depressions 39 in core element 38.

In Figures 7, 8 and 9, there is illustrated a third embodiment of the present invention, which embodiment is particularly adapted for use as a hinge type connector, such as, for example, for access doors in aircraft. This third embodiment is provided with means for retaining the ball elements 19 in release positions after they assume such release positions. As will be hereinafter described the use of these retaining means enables convenient reconnection and reuse of the hinge and access door as desired.

The principle of operation of this third embodiment is substantially similar to the operation of the embodiments previously described, except for the manner of effecting and controlling movement of ball elements 19, as will be described. This embodiment of the present hinge or release mechanism, generally designated in the drawings by the numeral 42, comprises a pair of longitudinally extending leaf members 43 and 44 provided with a plurality of transversely extending, spaced fingers or lobes 45 and 46, respectively, which lobes 45 and 46 embody a plurality of bushings 47 for accommodating a series of ball elements 19, all in a manner substantially identical to that described in connection with the lobes and bushings of the other embodiments described hereinbefore.

Each of the bushings 47 contains a pair of axially spaced retainer rings 48 made of yieldable or elastomeric material such as rubber, which rings 48 are mounted in place by being suitably fitted within internal annular grooves cut in the walls of the bushings 47. Rings 48 serve to receive ball elements 19 and yieldably retain them in position.

On the underside of leaf member 43 a pair of cam arms 49 and 51 are suitably pivotably mounted for movement within the opposite ends of member 43 to engage and bear against the end ones of the train of ball elements 19 to effect reciprocal movement of elements 19 in order that all of the elements 19 may be moved to desired positions. Figure 7 illustrates the positions that are assumed by cam arms 49 and 51 to locate the ball elements 19 in their securing positions and (as shown in phantom outline) the positions which must be assumed by these arms to dispose the ball elements 19 in their release positions. Location of cam arms 49 and 51, and, consequently, location of ball elements 19 in their securing or release positions, is brought about by the action of a pair of links 52 and 53 which are pivotally secured at their outer ends to cam arms 49 and 51, respectively, and pivotally secured at their inner ends to a pivotable screw plate 54, as best seen in Figures 7 and 8. It is apparent that movement of the links 52 and 53 in a release direction causes cam arms 49 and 51 to move whereby a force is applied to the ball elements 19 to move them from their centered positions relative to the spaced fingers 45 and 46. The shearing forces produced by the application of a separating or pulling force to the members 43 and 44, initially acting through the abutting edge portions of fingers 45 and 46 along the center lines of the ball elements 19, now act along lines offset from such center lines to assist or aid rapid movement of the ball elements 19 into their housed or release positions with fingers 45 and 46.

Screw plate 54 is rotatably disposed through and suitably retained as by a bracket 50 in a mating bushing 55 which is press fitted within a suitable opening provided in member 43, screw plate 54 being provided with a slot 56 to facilitate turning thereof with a screwdriver or the like. With this construction and arrangement of components it will be evident that rotation of screw plate 54 will effect a corresponding movement of links 52 and 53, and a consequent pivotal movement of cam arms 49 and 51 whereby ball elements 19 are reciprocally moved in or out of housed relation within lobes 45 and 46. Thus, if hinge mechanism 42 were associated with a small access door or the like, the door could be quickly and easily removed by turning screw plate 54 with a coin or screwdriver to shift ball elements 19 from securing to housed positions and pulling apart the lobes 45 and 46. Ball elements 19 would then be retained housed within the separated lobes 45 and 46 by the action of retainer rings 48. It may be noted in this regard that in providing lubrication for hinge mechanism 42, a thick lubricating material, such as graphite grease or paste, about ball elements 19 has operated not only to reduce friction, but has also operated satisfactorily to retain ball elements 19 within the separated lobes 45 and 46 in the absence of retainer rings 48. However, the action of rings 48, as provided in the embodiment of Figures 7, 8 and 9, is more positive in nature.

In all the embodiments hereinabove described it is apparent that the special shape of ball elements 19 affords spaces therebetween for accommodating any suitable lubricating material such as graphite grease or paste.

The various embodiments of the present invention provide a release mechanism which is adapted for securing together a plurality of members in a manner allowing for quick and simple disconnection or release therebetween. There has been described the unique utilization of the adaptability of ball elements 19 to be readily actuable from the points of applied and offset shear forces. This provision of a readily shiftable series of ball elements affords a simple and efficient mechanism for releasing a plurality of connected members, which members may be associated with a large variety of structural parts.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What I claim is:

1. A release mechanism comprising a pair of members which are each provided with a plurality of spaced lobes having internal bores, said lobes being mutually arranged in separable, abutting relation whereby said internal bores intercommunicate, a plurality of balls arranged in abutment within said internal bores with a ball spanning between each adjacent pair of abutting lobes of said pair of members for releasably securing said members together, and cam means having a pivoted camming member provided with a camming surface engaging one of said balls and movable from a locked position, wherein said camming surface acts against said plurality of balls to maintain said balls in said spanning relationship, to an unlocked position, said camming surface in moving to said unlocked position acting upon said plurality of balls to shift them within said bores.

2. A release mechanism comprising a pair of members which are each provided with a plurality of spaced lobes having internal bores, said lobes being mutually arranged in separable, abutting relation whereby said internal bores intercommunicate, a plurality of balls arranged in abutment within said internal bores with a ball spanning between each adjacent pair of abutting lobes of said pair of members for releasably securing said members together, cam means having a pivoted camming member provided with a camming surface engaging one of said balls and movable from a locked position wherein said camming surface acts against said plurality of balls to maintain said balls in said spanning relationship, to an unlocked position, said camming surface in moving to said unlocked position acting upon said plurality of balls to shift them within said bores, and means within said internal bores for receiving and yieldably holding said plurality of balls.

3. A release mechanism comprising members embodying intermating ball retainer means, a plurality of ball elements disposed within and normally spanning said ball retainer means to releasably hold said members in secured relationship, and cam means having a pivoted camming member provided with a camming surface engaging one of said balls and movable from a locked position to an unlocked position, said camming surface when in locked position acting against said plurality of ball elements to maintain them in said normally spanning relationship, said camming surface in its pivotal movement to said unlocked position urging said plurality of ball elements out of said spanning relationship to permit separation of said ball retainer means from said intermating relationship.

4. A release mechanism comprising members embodying intermating ball retainer means, a plurality of ball elements disposed within and normally spanning said ball retainer means to releasably hold said members in secured relationship, cam means having a locked position and including a pivoted camming member provided with a camming surface engaging one of said balls and being movable from said locked position to an unlocked position, said camming surface when in locked position acting against said plurality of ball elements to maintain them in said normally spanning relationship, said camming surface in its pivotal movement to said unlocked position urging said plurality of ball elements out of said spanning relationship to release positions to permit separation of said ball retainer means from said intermating relationship, and means within said ball retainer means for receiving and yieldably holding said plurality of ball elements in said release positions.

5. A release mechanism comprising a pair of members, each embodying a body portion provided with a plurality of transverse projections, each of said projections having a bore therethrough, said projections being arranged in interfitting relation with said bores in intercommunication, a plurality of ball elements disposed within and normally spanning said projections to releasably hold said members in secured relationship, cam means having a locked position and including a pivoted camming member provided with a camming surface engaging one of said balls and being movable from said locked position to an unlocked position, said camming surface when said cam means is in locked position acting against said plurality of ball elements to maintain said plurality of ball elements in normally spanning relationship, said camming member in its pivotal movement to said unlocked position urging said plurality of ball elements from said spanning relationship to release positions to permit separation of said ball retainer means from said interfitting relationship, actuating means for moving said cam means between said locked position and said unlocked position, and means within said projections for receiving and yieldably holding said plurality of ball elements in said release positions.

6. A release mechanism comprising members having a plurality of spaced, knuckle portions which mutually interfit, a plurality of ball elements located within said knuckle portions, said ball elements being centered relative to respective pairs of adjoining knuckle portions and spanning such pairs to releasably maintain said members in secured relationship, said ball elements being movable into a housed position within each of said knuckle portions upon displacement through a distance approximating the radius of one of said ball elements, said knuckle portions presenting to each other adjoining end margins, said end margins imparting a shear force upon said centered ball elements upon the imposition of a separating force against said members, and means adapted to initiate movement of said ball elements out of spanning relation with said knuckle portions whereby the shear forces on said ball elements aid in moving said ball elements into housed position within said knuckle portions to permit separation of said members.

7. The release mechanism as specified in claim 6 wherein said means adapted to initiate movement of said ball elements comprise bias means tending to urge said ball elements out of spanning relation with said knuckle portions and removable means disposed between a pair of said ball elements to maintain all of said ball elements in their spanning relation against the urging of said bias means whereby upon removal of said removable means said plurality of ball elements are initially moved by said bias means.

8. A release mechanism comprising members provided with journaled projections having edge portions mutually interfitted in abutting, separable relation, a plurality of ball elements arranged in said journaled projections with the ball elements being centered relative to respective pairs of abutting edge portions to releasably maintain said members in secured relationship, said ball elements being adapted for simultaneous displacement into a housed position in each of said journaled projections upon movement through a distance approximating the radius of one of said ball elements, and means operative on said ball elements for maintaining said secured relationship, said means including actuable means for moving said ball elements out of centered relation with said projections whereby a separation force imposed on said members aids in moving said ball elements into housed position within said projections to permit separation of said members.

9. The release mechanism as specified in claim 8 wherein the means operative on said ball elements for maintaining said secured relationship includes shearable members, and wherein the actuatable means for moving said ball elements provides a force through said ball elements for shearing said shearable members.

10. The release mechanism as specified in claim 8 wherein the means operative on said ball elements for maintaining said secured relationship includes shear pins, and wherein the actuable means for moving said ball elements comprises a wedge element for transmitting a force through said ball elements to shear said shear pins.

11. The release mechanism as specified in claim 8 wherein the means operative on said ball elements for maintaining said secured relationship includes displaceable means, and wherein the actuable means for moving said ball elements comprises a wedge element disposed between and notched to receive a pair of said ball elements and operable for applying a force through said plurality of ball elements to move said displaceable means, said wedge element being maintained in its operative position by said pair of ball elements.

12. The release mechanism as specified in claim 8 wherein the means operative on said ball elements for maintaining said secured relationship includes plug means associated with certain of said journaled projections, said plug means being adjustable for locating said ball elements centered relative to respective pairs of abutting edge portions, and said means for moving said ball elements out of said centered relation comprising bias means tending to urge said ball elements out of said center relation and removable means disposed between a pair of said ball elements to maintain all of said ball elements in their centered positions against the urging of said bias means whereby upon removal of said removable means said plurality of ball elements are initially moved by said bias means.

13. The release mechanism as specified in claim 8 wherein the means operative on said ball elements for maintaining said secured relationship includes plug means associated with certain of said journaled projections, said plug means being adjustable for locating said ball elements centered relative to respective pairs of abutting edge portions, and said means for moving said ball elements out of said centered relation comprising spring means expansible to urge said ball elements to travel out of said centered relation, housings for said spring means, said housings being adapted for limiting the extent of expansion of said spring means to thereby limit the travel of said ball elements in response to the urging of said spring means, and removable means transversely disposed between a pair of said ball elements to maintain all of said ball elements in their centered positions against the urging of said spring means whereby upon removal of said removable means said plurality of ball elements are shifted by said spring means toward their housed positions.

14. The release mechanism as specified in claim 8 wherein the means operative on said ball elements for maintaining said secured relationship includes plug means transversely disposed within certain of said journaled projections, said plug means being adjustable for locating said ball elements centered relative to respective pairs of abutting edge portions, and said means for moving said ball elements out of said centered relation comprising springs tending to urge said ball elements out of centered relation and an unlocking element disposed between a pair of said ball elements to maintain all of said ball elements in their centered positions against the urging of said springs whereby upon withdrawal of said unlocking element said plurality of ball elements are moved by said springs toward their housed positions.

15. A release mechanism comprising connecting members, said connecting members each embodying a body portion having a plurality of projecting finger portions having end margins, said finger portions of said members being arranged in interfitting relationship and each of said finger portions having a bore therethrough, said bores being in alignment, said end margins being serially adjacent each other, ball elements arranged in said aligned bores of said finger portions in centered relationship with said end margins to releasably maintain said members in connected relationship, said end margins exerting a shear force on the ball elements centered thereat upon imposition of a separating force on said members, said ball elements being adapted for simultaneous displacement into a housed position in each of said finger portions upon movement through a distance approximating the radius of one of said ball elements, and means adapted for moving said ball elements out of centered relationship with said end margins whereby said shear forces being exerted on said ball elements assist in moving said ball elements to housed positions within said finger portions to release said members.

16. A release mechanism comprising a pair of members which are each provided with a plurality of spaced lobes having end margins and internal bores, said lobes being mutually arranged in separable, abutting relation whereby said end margins are mutually adjacent and said internal bores intercommunicate, a plurality of balls arranged in abutment with each other within said internal bores with a ball spanning and centrally located within the end margins of each adjacent pair of abutting lobes of said pair of members for releasably securing said members together, stop means operative to maintain said balls in said securing position, and means for rendering said stop means inoperative to permit each of said ball elements to be moved out of its central location within said end margins whereby a force tending to pull apart said members tends to effect further movement of said ball elements to permit separation of said pair of members.

17. A release mechanism comprising a pair of members each embodying elongated body portions provided with a plurality of transverse projections having end margins and internal bores, said projections being mutually arranged in separable, abutting relation whereby said end margins are mutually adjacent and said internal bores are in intercommunicating alignment, a plurality of balls arranged in abutting relation within said internal bores with a ball spanning and centrally located within the end margins of each adjacent pair of abutting transverse projections, restraining means at each end of said elongated body portions operative to maintain said balls in position, and means actuable for rendering said restraining means inoperative to thereby permit each of said ball elements to be moved out of its central location within said end margins whereby a force tending to pull apart said members tends to effect further movement of said ball elements to permit separation of said pair of members.

18. A release mechanism comprising members each embodying intermating ball retainer means, ball elements arranged in abutting relation in holding positions in said ball retainer means to releasably hold said members in secured relationship, said intermating ball retainer means presenting to each other adjoining end margins, said ball elements being centered relative to said end margins, said end margins adapted to displace said ball elements into housed positions within said retainer means from a position just out of centered relationship therewith upon imposition of a separating force to said members, displaceable means for maintaining said ball elements in said holding positions, and means adapted for displacing said displaceable means and moving said ball elements just out of centered relationship with said end margins whereby said separating force tends to effect continued movement of said ball elements from said holding positions to release said members.

References Cited in the file of this patent

UNITED STATES PATENTS

| | | |
|---|---|---|
| 1,156,765 | Ely | Oct. 12, 1915 |
| 2,368,899 | Taylor | Feb. 6, 1945 |
| 2,369,148 | Langhorst | Feb. 13, 1945 |
| 2,534,998 | Steinbach | Dec. 19, 1950 |
| 2,636,211 | Williams | Apr. 28, 1953 |